United States Patent

[11] 3,612,449

| [72] | Inventor | Oscar W. Sepp<br>1 Mansion Drive, Morgan Island, N.Y. 10001 |
|---|---|---|
| [21] | Appl. No. | 791,401 |
| [22] | Filed | Jan. 15, 1969 |
| [45] | Patented | Oct. 12, 1971 |

[54] BOUNDARY LAYER CONTROL PARACHUTES
21 Claims, 16 Drawing Figs.

[52] U.S. Cl. .................................................. 244/145
[51] Int. Cl. ...................................................... B64d 17/02
[50] Field of Search ........................................... 244/145, 142, 152

[56] References Cited
UNITED STATES PATENTS

| 1,786,838 | 12/1930 | Fisher | 244/145 |
| 1,832,180 | 11/1931 | Broadwick | 244/145 |
| 1,862,247 | 6/1932 | Tricau | 244/145 |
| 2,358,233 | 9/1944 | Jorgensen | 244/145 |
| 2,764,375 | 9/1956 | Lemoigne | 244/145 |
| 2,929,588 | 3/1960 | Ewing | 244/145 |
| 3,393,885 | 7/1968 | Neumark | 244/145 |
| 3,508,726 | 4/1970 | Lemoigne | 244/152 X |

*Primary Examiner*—Milton Buchler
*Assistant Examiner*—Carl A. Rutledge
*Attorney*—Milton Robert Kestenbaum ABSTRACT: A parachute canopy has narrowing vents arranged annularly in ascending tiers uniformly about the canopy and covering a substantial portion of its radial length; the surface of the canopy beyond the mouth of the vent acts as an airfoil.

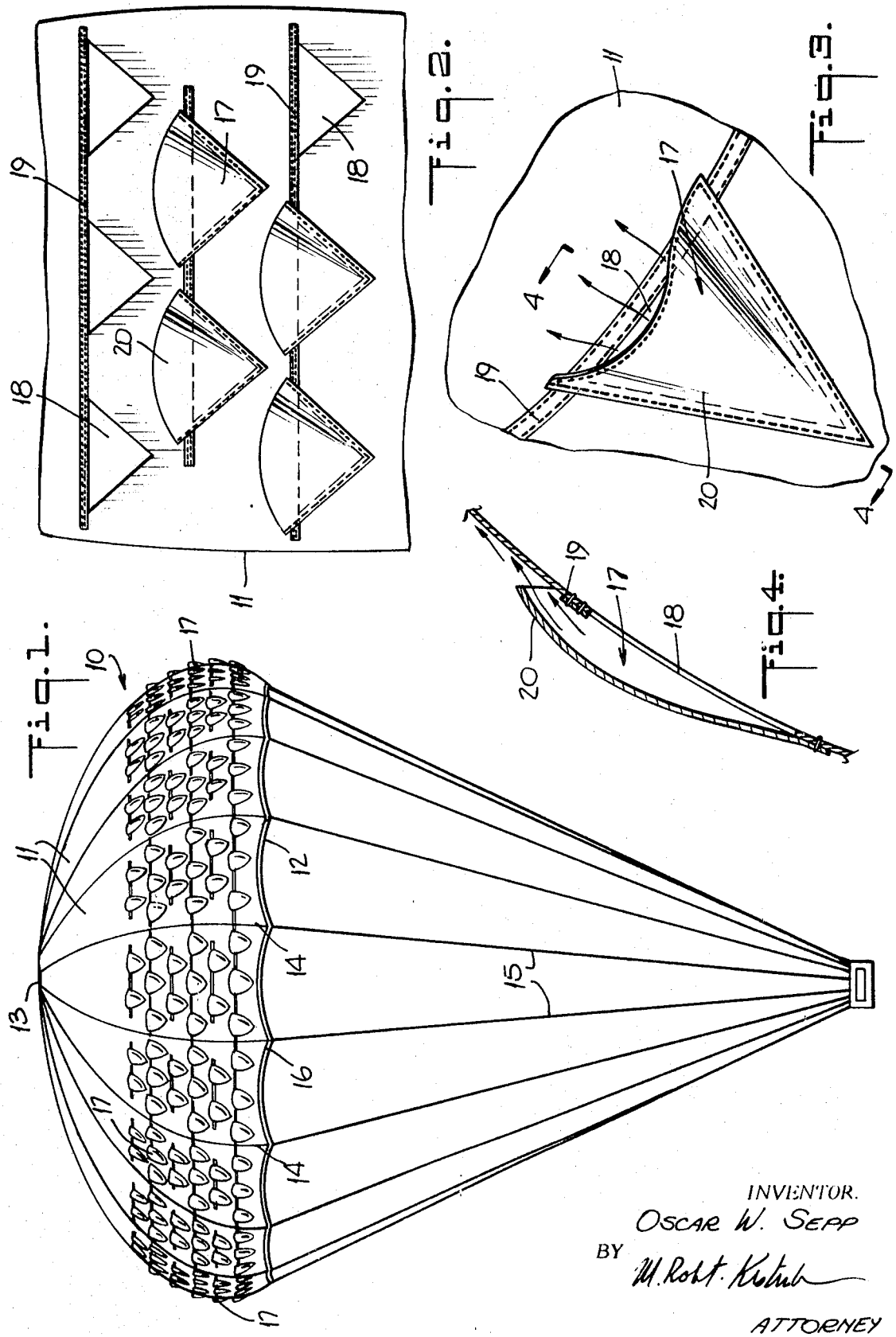

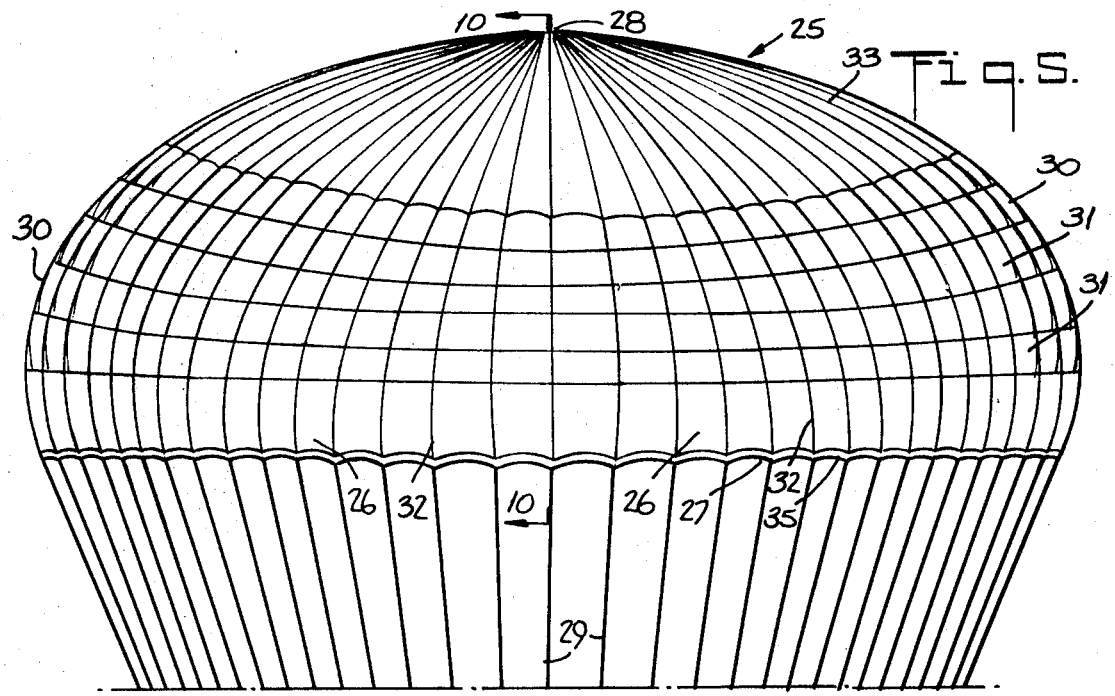
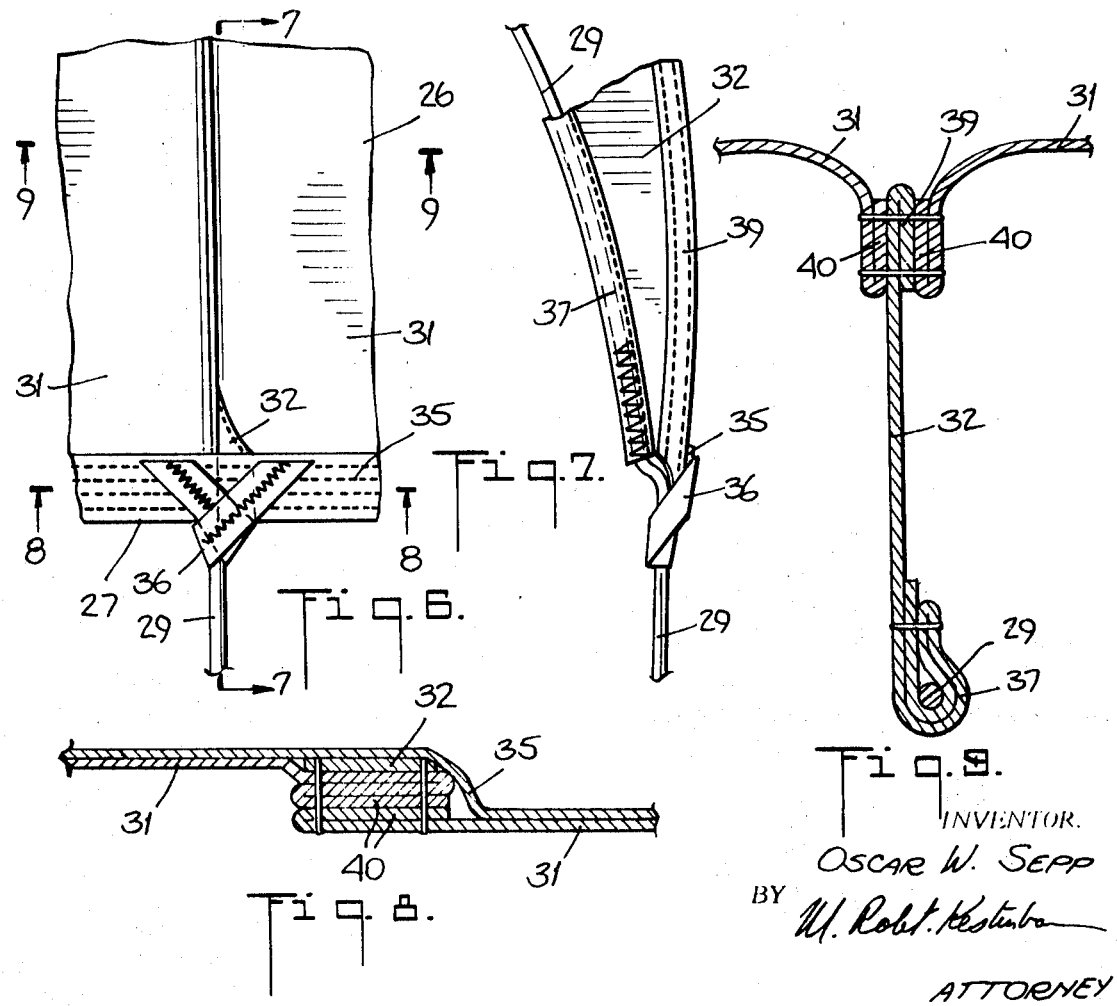

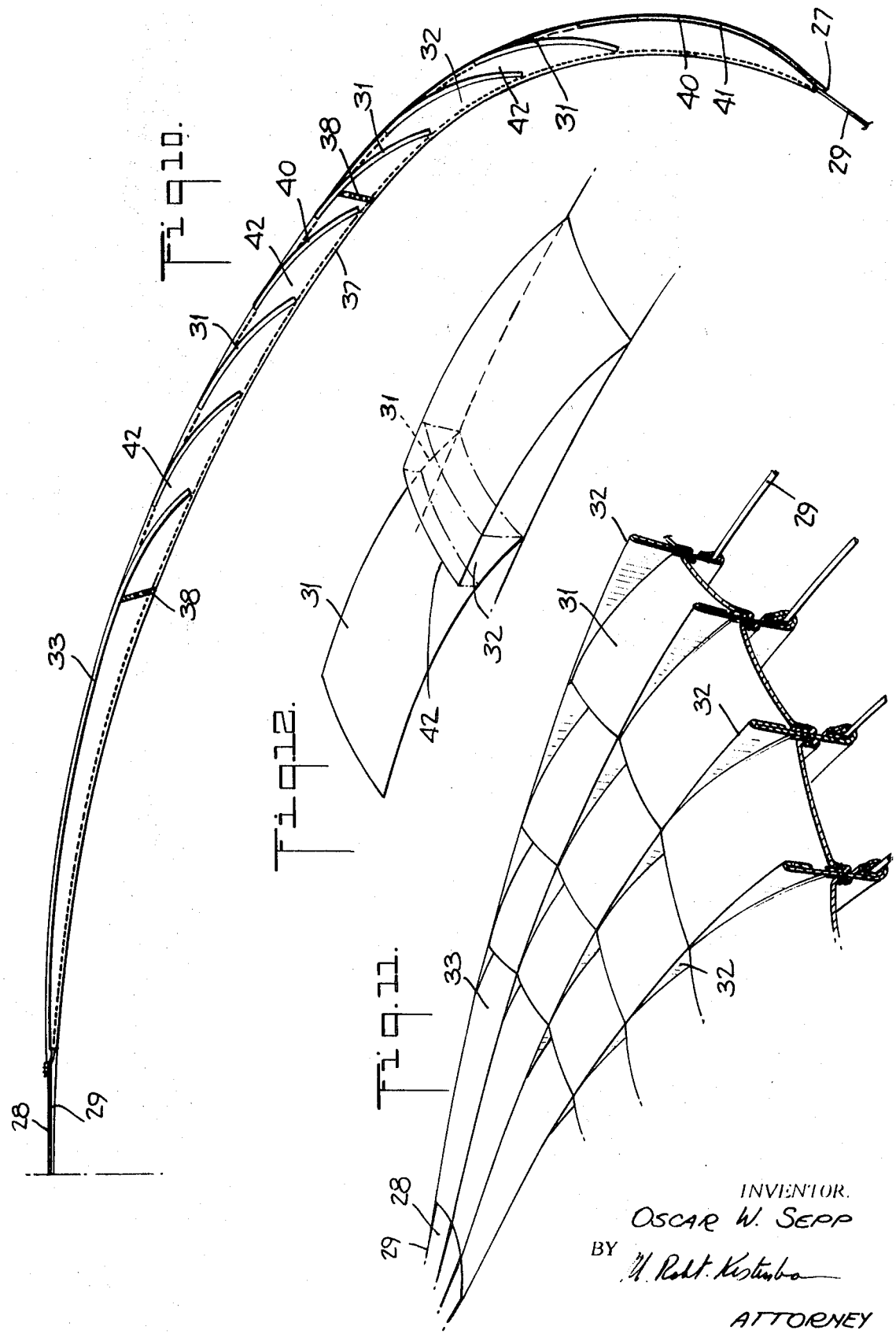

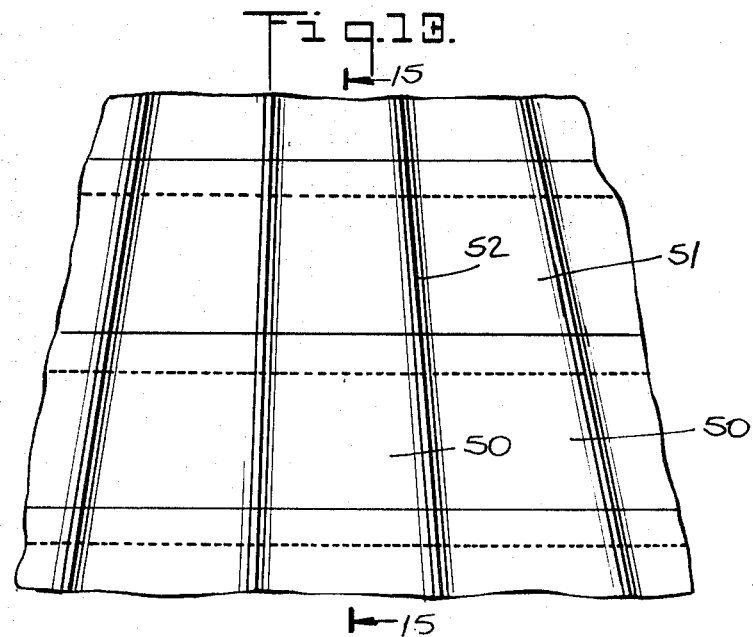
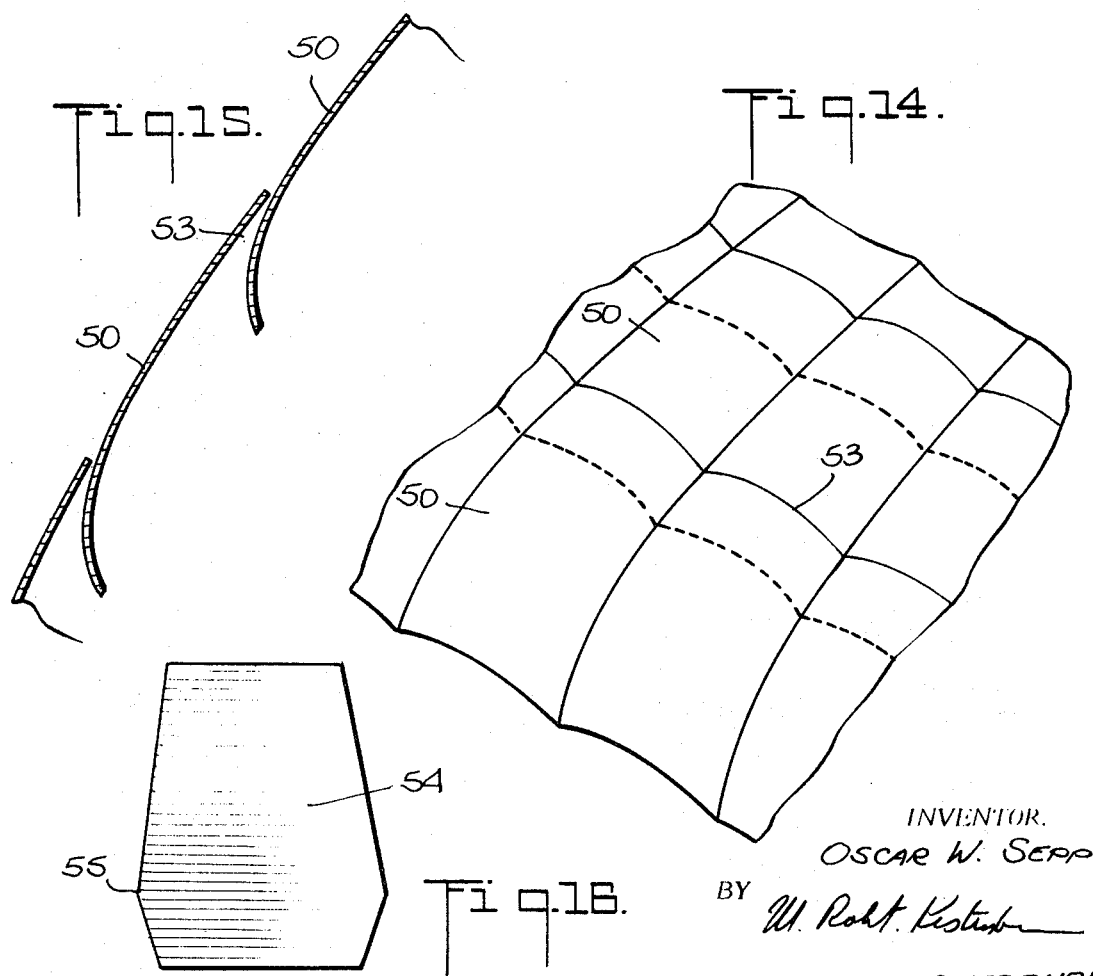

BOUNDARY LAYER CONTROL PARACHUTES

BOUNDARY LAYER CONTROL PARACHUTES

This invention relates to parachute canopies and more particularly to canopies of the vented type.

A constant quest in parachute design is for higher drag and greater stability through novel canopy configurations. Heretofore the vent deign which has been employed for this objective permits the air to pass through the canopy rather than spill out at the canopy skirt and accentuate its instability. More often, vents have served to reduce the opening shock on the seams and fabric of the canopy and to provide horizontal flow currents to direct the lateral movement of the parachute as it descends.

In this invention very high drag is combined with low oscillation by admitting high-pressure air from the interior of the canopy through vents to the exterior surface in a controlled and directed manner. Whereas a 28-foot diameter solid flat-circular canopy will exhibit drag coefficients in the order of 0.65 to 0.90 per Technical Report ASD TR–61–579 "Performance of and Design Criteria for Deployable Aerodynamic Decelerators," and stability in the order of ± 30 degrees of oscillation, the same canopy when modified to include venting according to this invention, has exhibited three times the drag and twice the stability.

Accordingly it is a principle object of the invention to provide a venting arrangement for parachutes which markedly increases drag and stability.

Another object of this invention is to combine an arrangement of a shaped canopy and venting to provide high lift and high stability.

A further object of this invention is to provide a large number of air foils over a substantial portion of a parachute canopy surface as to employ aerodynamic principles for increased lift and stability.

Another object of this invention is to establish a flow of air over a substantial radial portion of the outer surface of a parachute canopy whereby the exterior flow separation point of the air passing over the canopy is moved closer to the canopy apex.

A further object of the invention is to employ tiers of accelerating vents over a substantial portion of the surface of a canopy so a to increase the pressure differential between the interior and the exterior of the canopy.

These objects are accomplished in the present invention by vents annularly arranged in ascending tiers uniformly about the canopy and covering a substantial portion its radial length. The vents admit high-pressure air from the canopy interior and direct its flow over the surface of the canopy so that a substantial portion of the canopy radially and annularly has this upward flow of air over it. In a preferred embodiment, the vents are formed by overlapping bands which tend towards each other in the upward direction so as to accelerate the air flow passing between them and thus accentuate the pressure differential between the interior and the exterior of the canopy. The bands are formed by panels secured along their radial edges. All panels within a common gore, that is, all radially adjacent panels are secured to a common pair of standing ribs which extend radially between the apex and the skirt over a substantial portion of the radial length of the canopy.

These and other features and objects of this invention will be understood from the following detailed description taken together with the drawings in which:

FIG. 1 shows a side view of a vented canopy according to the invention;

FIG. 2 shows a portion of a single vented gore with several triangular vent covering pieces removed;

FIG. 3 is a perspective view of a vent as the air passes through it;

FIG. 4 is a section view taken through lines 4—4 in FIG. 3;

FIG. 5 is a side view of a vented canopy according to another embodiment of the invention;

FIG. 6 is a plan view of a portion at the skirt of the vented canopy shown in FIG. 5.

FIG. 7 is a section view taken through lines 7—7 in FIG. 6;

FIG. 8 is a section view taken through lines 8—8 in FIG. 6;

FIG. 9 is a section view taken through lines 9—9 in FIG. 6;

FIG. 10 is a section view taken through lines 10—10 in FIG. 5;

FIG. 11 is a perspective view of a portion towards the apex of the vented canopy shown in FIG. 5;

FIG. 12 is a schematic view of a single vent according to the embodiment shown in FIGS. 5 through 11;

FIG. 13 is a plan view of a portion of a canopy according to a third embodiment of the invention;

FIG. 14 is a perspective view of the embodiment shown in FIG. 13;

FIG. 15 is a section view taken through lines 15—15 in FIG. 13;

FIG. 16 is a plan view of the flat pattern for an individual panel for the embodiment according to FIGS. 13 through 15.

Referring to FIG. 1, a parachute 10 is comprised of a series of essentially triangular gores 11 and has a skirt 12 and a central vent 13 at its apex. The radial edges of adjacent gores are overlapped and stitched at radial seams with reinforcement provided by radial tapes 14 which run to the central vent. Suspension lines 15 overlie the radial tape and are stitched along the radial seam for a short distance above the skirt. A skirt band 16 is stitched around the outside of the skirt, under the suspension lines.

Between the skirt 12 and the central vent 13, each gore is provided with tiers of annularly arranged, upwardly directed vents 17, the purpose of which is to admit air from the canopy interior upwards over the exterior surface of the canopy in a controlled and directed manner. The tiers of vents 17 ring the canopy uniformly and cover a substantial portion of the canopy radial distance between the skirt 12 and the central vent 13, so that the upward flows of air are directed uniformly about the canopy and over a substantial radial portion of the canopy surface.

In a quadrispherical-shaped gore canopy, the first tier of vents are spaced by a wide band above the canopy skirt. Then the vents rise in tiers towards the apex in alternately staggered rows of twos and threes. The vents commence between the skirt and the point of maximum diameter on the canopy and continue past the point of maximum diameter into the area of gentler slope and greater radius of curvature in the direction of the apex.

THus, the tiers of vents occupy a substantial portion of the canopy. Measured from the plane of the skirt, the tiers of vents can rise as much as 30 degrees or more, the particular rise will in each case depend upon the shape, type and size of the canopy in question.

For relative sizes and positions, one may consider the following example which is given by way of illustration only, without intending to restrict the invention to these dimensions.

In one example, a canopy having gores 100 inches long, the lowest tier of gores commence about 15 inches above the skirt and the highest tier of gores end about 60 inches above the skirt. In such a canopy, in which each gore may be about 28 inches wide at its widest point, each vent is about 6 inches wide. The dimensions, and indeed the configuration of canopies will differ markedly, but the dimensions of the vent will not vary appreciably between canopies.

The radial spacing between corresponding vent portions is about 5½ inches. The lateral spacing between laterally adjacent vents in the lowest tier may be over one foot. This lateral spacing decreases in successively higher tiers.

In terms of gore coordinates according to the relationship $Y = A \times D_o$ where $Y$ is the radial distance from the skirt and $D_o$ is the nominal diameter of the canopy and $A$ ranges between 0.0 at the skirt to 0.547 at the apex, the vents will commence at $A = 0.04$, the maximum diameter of the canopy will occur at $A = 0.063$, the vents will end at $A = 0.030$ and the apex vent will commence at $A = 0.514$.

The canopy shown in this embodiment is a quadrispherical-shaped gore canopy, in which the widest point of the canopy occurs a distance in the range of 10 percent above the skirt, measured radially. This well known type of canopy has been found to produce very good results in terms of increased stability and lift with the upwardly directed vents. However, the invention is not restricted to this configuration and other canopy configurations including flat-circular and hemispherical canopies, will also show increased stability and drag.

Referring to FIGS. 2, 3 and 4 each of the vents 17 is comprised of a triangular cutout 18 in the canopy material approximately 6 inches on its long horizontal side. A ribbon of nylon material 19 provides reinforcement at the long side. Stitched over the cutout 18 along its converging legs is a triangular piece 20, which is arc shaped along its long side, to give it a definite overlap when bowed out, over the horizontal edge of cutout 18.

For strength, it is usual in the art for the warp and fill threads of the nylon fabric to run diagonally through the gore. However, with the threads thus oriented, it has been found that the horizontal stretch of the material closes up the vent 17. Hence, in this embodiment, the warp and fill of the gore fabric are oriented horizontal-vertical, while the orientation of the fabric of the triangular piece 20 may be diagonal or horizontal-vertical.

Advantageously, the gore fabric is less porous than the normal military specification cloth for parachutes. Standard porosity is 100 cubic feet per minute per square foot, measured under a pressure of ½ inch of water. The canopy fabric for the present invention is less porous to about 4 cubic feet per minute per square foot. Less porous fabric makes for less turbulence upon the canopy surface from air passing through the fabric and makes the canopy above the vent more like an airfoil—hence, more suitable for aerodynamic characteristics.

The narrowing of the vent between the overlapped portions of the triangular piece 20 and the canopy above the cutout 18 increases the velocity and reduces the pressure of the air that passes through it.

The air passing through the vent is directed over the surface of the curved aerodynamic sail which is formed by the cloth directly beyond the mouth of the vent which results in low pressure on the outer surface of the portion of the canopy directly above the vent—and hence, greater lift. The vents serve to retain the attached flow of air passing over the canopy for an additional radial distance before separating into vortices.

Referring to FIGS. 5 and 6, a parachute 25 has a series of essentially triangular gores 26, a skirt 27, a skirt band 35, an apex vent 28, suspension lines 29 and butterfly reinforcement tapes 36 arranged in a manner similar to the solid canopy shown in FIG. 1. In this embodiment, the canopy is comprised of an arrangement of bands 30. Each band is a series of panels 31 joined together stitching along their radial edges at radial standing ribs 32 located at every radial seam. Each radially adjacent panel 31 shares a common standing rib 32. The upper portion of each lower panel overlaps the panel above it, so as to provide tiers of annularly arranged upwardly directed vents.

Referring to FIGS. 7 through 9 the suspension lines 29 are stitched within the folds 37 along the inner edges of the standing rib 32. At its outer edge, the standing rib also has a fold 39 which is positioned between the folds 40 on the radial edges of laterally adjacent panels. The panels are aligned and stitched to the standing rib so as to form the annular bands 30. At the skirt band 35, the end of the standing rib is turned to lie flat upon the folds 40 of adjacent panels 31 which are also twisted a quarter-turn clockwise to lie flat beneath the skirt band 35.

Referring to FIGS. 10 and 11, the standing ribs 32 proceed from the skirt 27 to the central vent 28 at the canopy apex, and are spliced and reinforced at two places 38. The rib commences at a very narrow end near central vent 28 and widens as it curves towards the skirt. Relatively close to the skirt, the standing rib narrows again to its lower end. Commencing at the skirt, a relatively wide band of panels 41 is secured to the standing rib. In underlapped relation to this wide band and successively underlapped in relation to each other are successive levels of panels 31, joined to the standing rib in the manner described above. The panels 31 are curved or displaced towards the central vent and are secured to the standing ribs so that the space 42 between radially adjacent panels narrows in the upwards direction. Hence, the ribs 32 provide the means for establishing spacing between the overlapped portions of each pair of radially adjacent band panels 31. This spacing 42 communicates between the interior and the exterior of the canopy and thus is an upward directed vent for admitting airflows from the interior of the canopy, upward over the canopy surface. The ribs 32 also provide the sidewalls for the upward directed vent 42 whose upper and lower walls are formed by the upper and lower radially adjacent band panels 31.

Above the uppermost panel 31, the canopy continues in unbroken panels 33 to the apex vent where the suspension lines 29 extend across the vent to the radially opposed standing rib.

Referring to FIG. 12, the standing ribs 32 provide the vent 42 with a substantially uniform opening height across the width of its mouth. This uniform opening provides for efficient venting by directing a uniform flow of air over the canopy surface above it.

As the vent narrows in the upward direction it accelerates the air flow through it. The accelerated air which exits at the mouth of the vent 42 is decreased in pressure in accordance with Bernoullie's theorem. As a result, the differential between the internal and external pressures at the canopy surface—and hence the lift vertically of the parachute—is increased.

The pressure differential is aided as well because the air is directed to pass upward upon the surface of the curved aerodynamic sail which is formed by the panel directly beyond the mouth of the vent and also results in lower pressure on the outer surface of the panel. The higher radially adjacent panel acts as an airfoil starting at the mouth of the vent. The airflows from the vents serve to retain the attached flow of air upon the canopy. The exterior flow separation point of the layer of air which passes over the canopy is moved closer to the central vent before it breaks away in vortices; that is, the detachment of the attached flow occurs further up along the canopy than it otherwise would. Hence, more of the canopy is used for lift which increases its drag and its stability.

Test data indicate a drag coefficient of 20 to 50 percent higher than an equivalent solid canopy while stability is consistently less than plus or minus 5 degrees compared to plus or minus 30 degrees for solid canopies.

Referring now to FIGS. 13 through 15 a third embodiment of the invention is disclosed in which adjacent panels 50 of overlapping canopy bands 51 are folded and joined along radial seams 52. In this arrangement, the vent assumes a crescent shape at its mouth since the overlapped portions of radially adjacent panels 50 are joined together by stitching at the radial seams 52. Importantly, the space 53 between radially adjacent and overlapped panels 50 narrows so as to produce an upwardly directed velocity-increasing vent. This narrowing is determined by the shape of the flat panel pattern 54 as shown in FIG. 16. The flat panel opens to a widest point 55 at about ¾ of its length from the apex direction.

With or without the standing rib 32, the radially adjacent bands overlap in the order of ¼ of the radial length of the band.

The narrowing of the vent 53 between the overlapped bands increases the velocity and reduces the pressure of the air which passes from the interior to the exterior of the canopy through this vent. This air is directed to pass tangentially over the surface of the curved aerodynamic sail which is formed by the panel directly beyond the mouth of the vent and results in a lower pressure on the outer surface of panel. The higher panel acts as an airfoil, starting at the mouth of the vent.

What is claimed is:

1. A parachute canopy of a design arranged to retain airflows commencing in the vicinity of its skirt attached over a substantial portion of its radial length, having radially arranged gores and seams comprising a plurality of annularly arranged bands disposed in ascending tiers covering a substantial portion of said canopy, each of said bands overlapping the radially adjacent band above it and at least partially spaced therefrom in the area of the overlap, said overlapped portions providing upwardly and apex directed and upwardly narrowing annular passages forming accelerating vents over a substantial portion of said canopy commencing in the lower portion of said canopy in the vicinity of the skirt for directing flows of air from the interior of said canopy upon the outer surface of said adjacent above bands.

2. A parachute canopy according to claim 1 in which radially adjacent bands are separated at the canopy radial seams.

3. A parachute canopy according to claim 2 in which said radially adjacent bands are separated by radially oriented separating means.

4. A parachute canopy according to claim 1 in which said passages are substantially uniform in height across their mouths.

5. A parachute canopy according to claim 1 in which the surface of the canopy beyond the mouth of said passages provides a curved airfoils to said airflows.

6. A parachute canopy according to claim 1 in which radially adjacent bands are overlapped approximately one-fourth of their respective radial lengths.

7. A parachute canopy according to claim 1 in which said bands are comprised of panels; each panel widens at a point remote from its apex end and narrows at its skirt end relative to said point.

8. A parachute canopy of a design arranged to retain air flows commencing in the vicinity of its skirt attached over a substantial portion of its radial length, having radially arranged gores, radially arranged gore seams, a skirt, an apex and vent means for admitting a quantity of air from the interior of said canopy over a substantial portion of the exterior thereof, said vent means being annularly arranged accelerating vents on said canopy in a plurality of tiers ascending to a substantial elevation between the skirt and the apex and commencing in the lower portion of the canopy in the vicinity of the skirt, said vent means being arranged upwardly and towards the apex and narrowing upwardly for directing the flow of air upwards upon the exterior surface of said canopy for increasing the lift and stability of said canopy.

9. A parachute canopy according to claim 8 in which said tiers of vent means extend at least 30 degrees from the canopy skirt measured from the plane of said skirt.

10. A parachute canopy according to claim 8 comprising
a plurality of gores joined together at their edges and converging at their apex towards the apex of said canopy, and
a plurality of suspension lines secured to said canopy at the junction of adjacent gores,
each of said gores comprising a plurality of panels in overlapped arrangement from the skirt portion towards the apex providing said vent means, the lower one of said pair of radially adjacent panels overlapping the panel above it and arranged to provide surfaces directed upwards toward each other in the overlapped region.

11. A parachute comprising a plurality of standing ribs oriented radially and disposed about said canopy between the apex and the skirt thereof, a plurality of radially oriented panels secured between adjacent standing ribs with said standing ribs extending above the top surfaces of said annular panels at least in part, said panels forming annular bands in which each lower band overlaps and is displaced from the band above it and is arranged to provide a plurality of ascending tiers of vents over a substantial portion of the canopy, the spaces between overlapped portions having an upward and apex orientation and narrowing in the upward direction, said vents commencing in the lower portion of the canopy.

12. A parachute canopy according to claim 11 in which radially adjacent panels are secured between common standing ribs.

13. A parachute canopy according to claim 11 in which the upper portion of each panel is displaced towards the canopy apex.

14. A parachute canopy according to claim 11 in which laterally adjacent panels are folded over at their radial edges and said standing rib is folded over at its outer edge, and stitched between said panel folds.

15. A parachute canopy according to claim 11 in which said standing rib is folded over at its inner edge and said suspension line is stitched within said fold.

16. A parachute of a design arranged to retain air flows commencing in the vicinity of its skirt attached over a substantial portion of its radial length, comprising a canopy having radially arranged gores and gore seams from a central apex and means for introducing flows of air from the interior to the exterior thereof comprising an ascending plurality of tiers of apex-directed vents, annularly arranged over a substantial portion of the surface of the canopy commencing in the lower portion thereof in the vicinity of the canopy skirt and means for accelerating said flows of air and directing said flows upon the outer surface of the canopy comprising means for narrowing said vents in the upward direction towards the apex of the canopy.

17. A parachute according to claim 16 in which said latter means comprises overlapped material portions, the passage between said overlap narrowing in the downstream direction.

18. A parachute according to claim 16 in which the surface of said canopy upon which said flows are directed provides airfoils for said flows.

19. A parachute according to claim 17 in which the surface of said canopy upon which said flows are directed provides airfoils for said flows.

20. A parachute canopy having annular arrangements of upward, apex-directed vent uniformly thereabout in a plurality of ascending vent tiers opening over a substantial portion of the canopy surface and commencing in the vicinity of the skirt portion thereof, each vent communicating from the interior to the exterior of the canopy, said canopy comprising a plurality of radially arranged standing ribs extending between the canopy apex and the canopy skirt and an ascending plurality of successive annular bands, with said standing ribs extending above the top surfaces of said annular bands at least in part, said bands each underlapping a substantial distance the band below it, secured to said standing ribs over a substantial portion of the canopy radial length, and each band being curved at its upper portion towards the canopy apex so that a plurality of spaces between radially adjacent bands narrow in the upwards and apex direction, said spaces forming the upward directed vents.

21. A parachute canopy according to claim 20 wherein said annular bands are each comprised of curved panels secured along their entire radial edge between adjacent standing ribs, said standing ribs being of a width throughout their length sufficient to have secured to them the entire radial length of said panels.